US009882953B2

(12) United States Patent
Panattu et al.

(10) Patent No.: US 9,882,953 B2
(45) Date of Patent: Jan. 30, 2018

(54) SYSTEMS AND METHODS FOR MANAGING NETWORK SERVICES BASED ON REAL-TIME AND HISTORICAL DATA

(71) Applicant: RingCentral, Inc., Belmont, CA (US)

(72) Inventors: Santosh Panattu, San Jose, CA (US); Patrice Khawam, San Francisco, CA (US)

(73) Assignee: RingCentral, Inc., Belmont, CA (US)

( * ) Notice: Subject to any disclaimer, the term of this patent is extended or adjusted under 35 U.S.C. 154(b) by 37 days.

(21) Appl. No.: 14/830,682

(22) Filed: Aug. 19, 2015

(65) Prior Publication Data
US 2017/0054784 A1    Feb. 23, 2017

(51) Int. Cl.
*H04L 12/56* (2006.01)
*H04L 29/06* (2006.01)
*H04L 12/26* (2006.01)
*H04L 12/725* (2013.01)

(52) U.S. Cl.
CPC .......... *H04L 65/80* (2013.01); *H04L 43/0829* (2013.01); *H04L 45/302* (2013.01); *H04L 65/1069* (2013.01)

(58) Field of Classification Search
USPC ...................................................... 370/389
See application file for complete search history.

(56) References Cited

U.S. PATENT DOCUMENTS

| 7,403,487 B1 | 7/2008 | Foladare et al. |
| 2006/0268828 A1* | 11/2006 | Yarlagadda ........... H04M 7/006 370/352 |
| 2008/0049748 A1* | 2/2008 | Bugenhagen .......... H04L 12/14 370/389 |

FOREIGN PATENT DOCUMENTS

EP    1324628 A1    7/2003

\* cited by examiner

*Primary Examiner* — Edan Orgad
*Assistant Examiner* — Sithu Ko
(74) *Attorney, Agent, or Firm* — Finnegan, Henderson, Farabow, Garrett & Dunner, LLP

(57) ABSTRACT

Systems and methods are provided for facilitating media communication sessions along a path established between endpoints over one or more networks, wherein each media communication session includes a transmission of one or more media data packets over the one or more networks. The systems and methods may include receiving a request from a first endpoint to initiate a media communication session. A system may, responsive to receiving the request, determine a configuration for the media communication session from among a set of potential configurations. The determined configuration may include a path involving one or more network elements configured to process and to transmit the media data packets, and the determination can be based on (i) a historical measurement and a real-time measurement of one or more parameters contributing to an expected quality of media communication, and (ii) a target quality of media communication.

26 Claims, 10 Drawing Sheets

300

| Network | Weight (%) | Possible Scores |
|---|---|---|
| Bandwidth | 20 | if bandwidth<128kbps: score=1<br>if bandwidth>128kbps: score=2 |
| Latency | 20 | if latency<20ms: score=3<br>if latency>20ms: score=2 |
| Packet loss rate | 20 | if packet loss<5%: score=3<br>if packet loss>5%: score=1 |

— 301

| Server metric | Weight (%) | Possible Scores and Costs |
|---|---|---|
| Codec | 20 | If G.722/G.711: score=2<br>If G.729: score=1 |
| Location | 10 | if same location with endpoint: score=3<br>Else: score=0 |
| CPU speed | 5 | if speed>=1.5G: score=3<br>Else: score=0 |
| Queue depth | 5 | if queue depth < 50: score=3<br>Else: score=0 |

— 302

| Time of creation | 8/5/2015, Wednesday At 6pm |
|---|---|

| Data Centers | Com server 119A | Com server 119B |
|---|---|---|
| CPU Speed | 1G | 2G |
| Available codec | G.729, G722, G.711 | G.722 and G.711 |
| Max allowed queue depth | 300 requests for Calling plan A | 100 requests for Calling plan A |
| Queue depth | 250 requests | 50 requests |
| Cost | 10 | 50 |

— 321

| PSTN provider | PSTN A | PSTN B |
|---|---|---|
| Load | 20 | 40 |
| Cost | 50 | 10 |

— 322

| Network | Network C | Network D |
|---|---|---|
| Bandwidth | 1Gbps | 5Gbps |
| Cost | 20 | 100 |
| Latency | 30ms | 20ms |
| Packet loss rate | 10% | 5% |

— 323

| Time of creation | 8/5/2015, Wednesday At 6pm |
|---|---|

SYSTEMS AND METHODS FOR MANAGING NETWORK SERVICES BASED ON REAL-TIME AND HISTORICAL DATA

FIELD

The present disclosure relates to network services management, and more specifically, to management of network resources for multimedia communication services based on real-time and historical data.

BACKGROUND

There are many existing network services that require real-time delivery of multimedia data over a network. For example, packet-based telephony service, such as voice-over-IP ("VoIP") telephony, typically includes the real-time delivery of voice, and possibly other multimedia data types such as video data, on a network using RTP (Real-Time Transport Protocol) to exchange information required to control the delivery of data. The perceived quality of VoIP telephony service can be determined by various parameters affecting the real-time delivery of the data over the network, such as network conditions, and the network resources allocated for the delivery of the data.

SUMMARY

The present disclosure arises from the realization that real-time delivery of multimedia data can be adversely affected by various conditions along a network through which the data is delivered, such as network congestion, and performance and capacity of various components of the network. Moreover, the decision to allocate specific network resources to provide a certain quality of multimedia service can be constrained by factors including, but not limited to, the geolocation of the network the customer is operating in, a pre-determined quality of the service the customer has subscribed to, the cost associated with routing the multimedia data via a particular path, etc. In order to provide a satisfactory quality of multimedia service in a robust and efficient manner, most, if not all, of the aforementioned factors can be considered together contemporaneously in real-time in making a decision about routing the multimedia traffic and allocating network resources. However, network systems traditionally do not take into account information beyond network data at the protocol level when assessing quality of service. Moreover, such information considered by legacy network systems is often not obtained in real-time and based on historic data alone.

A method for facilitating media communication sessions along a path established between endpoints over one or more networks is disclosed. Example embodiments herein provide methods and systems for determining a configuration for the media communication session based on a historical measurement and a real-time measurement of one or more parameters contributing to an expected quality of media communication over the one or more networks, and based on a media quality associated with the media communication session.

Consistent with an embodiment disclosed herein, a computer-implemented method for facilitating media communication sessions along a path established between endpoints over one or more networks is provided. The method comprises receiving a request from a first endpoint to initiate a media communication session, which includes a transmission of one or more media data packets over the one or more networks. The method also comprises determining, responsive to receiving the request, a configuration for the media communication session from among a set of potential configurations, wherein the determined configuration includes a path involving one or more network elements configured to process and to transmit the media data packets associated with the media communication session, wherein the determination is based on (i) a historical measurement and a real-time measurement of one or more parameters contributing to an expected quality of media communication, and (ii) a target quality of media communication, and wherein at least one of the one or more parameters is associated with the one or more network elements.

Consistent with another disclosed embodiment, a system for facilitating media communication sessions along a path established between endpoints over one or more networks is provided. The system comprises one or more memories having stored thereon computer-executable instructions, and one or more processors configured to execute the stored instructions. When the stored instructions are executed, the one or more processors can receive a request from a first endpoint to initiate a media communication session, which includes a transmission of one or more media data packets over the one or more networks. The one or more processors can also determine, responsive to receiving the request, a configuration for the media communication session from among a set of potential configurations, wherein the determined configuration includes a path involving one or more network elements configured to process and to transmit the media data packets associated with the media communication session, wherein the determination is based on (i) a historical measurement and a real-time measurement of one or more parameters contributing to an expected quality of media communication, and (ii) a target quality of media communication, and wherein at least one of the one or more parameters is associated with the one or more network elements.

Consistent with other disclosed embodiments, non-transitory computer-readable storage media can store program instructions, which are executed by at least one processor device and perform any of the methods described herein.

The foregoing general description and the following detailed description are explanatory only and are not restrictive of the claims.

BRIEF DESCRIPTION OF THE DRAWINGS

The accompanying drawings, which are incorporated in and constitute a part of this disclosure, illustrate several embodiments and, together with the description, serve to explain the disclosed principles. In the drawings:

FIGS. 1, 2, 3A, and 3B are diagrams of example communication systems in which various implementations described herein may be practiced.

DETAILED DESCRIPTION

Figure 1:
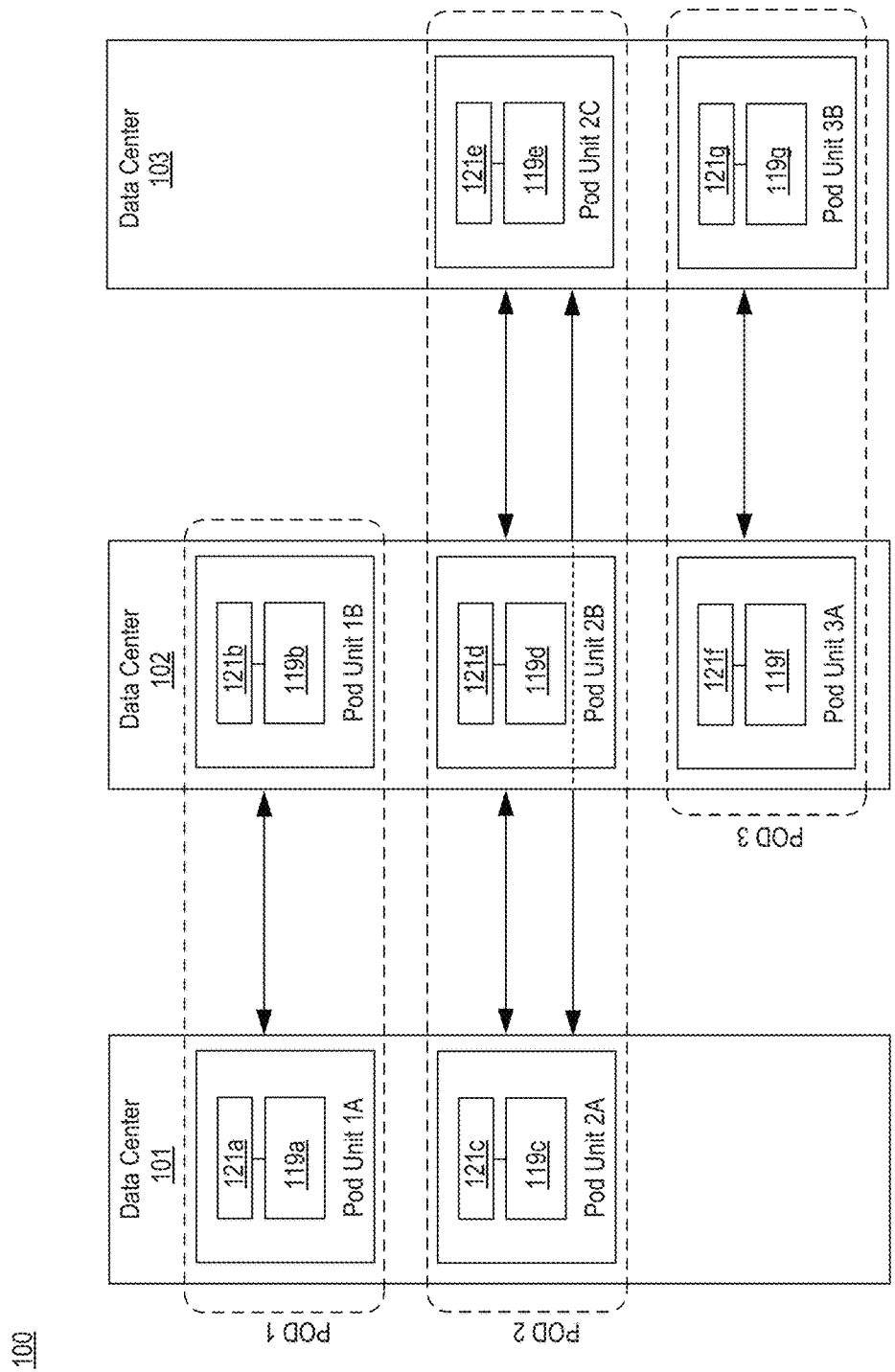

The embodiments disclosed herein concern managing network services. In some embodiments, an apparatus (e.g., a server) having one or more processors can receive a request from a first endpoint to initiate a media communication session, wherein the media communication session includes a transmission of one or more media data packets over one or more networks. The apparatus, which is configured to establish a path for transmission of the one or more media data packets over the one or more networks, can, responsive to receiving the request, determine a configuration for the media communication session from among a set of potential configurations, wherein the determined configuration includes configuration of one or more network elements to establish the path to process and to transmit the media data packets associated with the media communication session.

The apparatus can determine the configuration based on (i) a historical measurement and a real-time measurement of one or more parameters that contribute to an expected quality of media communication, and (ii) a target quality of media communication associated with the media communication session. In some embodiments, the one or more parameters include a value representing the connectivity along the path and a value representing the capacity of at least one of the one or more network elements to process the media data packets.

In some embodiments, the determined configuration includes one or more first settings associated with one or more first components along the path, where the historical measurement of the one or more parameters is also associated with the one or more first settings at a time when the one or more parameters were measured, and the one or more first settings is generated based on one or more second settings acquired in real-time. In some embodiments, the determination of the configuration is further based on at least one of: a notification, an exception, an alarm, and an error received from one or more components along the path.

The apparatus can access the information about a real-time measurement of one or more parameters that can affect the transmission of media data packets for the media communication session, as well as information related to a media quality associated with the media communication session. As many of the one or more parameters can be relatively static or predictable in nature (e.g., a similar network latency occurring at a particular time every day), the combination of information can allow the apparatus to determine the configuration (including, for example, selecting a path to process and to transmit the media data) in a robust or efficient manner. Accordingly, using a historical measurement of these parameters to determine the configuration allows the determination to be made in a predictive manner, before exposing the network traffic to unwanted network conditions.

Reference will now be made in detail to methods and specific implementations that seek to overcome the previously mentioned shortcomings of current systems for processing network requests. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as provided by the appended claims. In addition, specific details may be provided in order to promote a thorough understanding of the described implementations. Some implementations within the scope of this disclosure may be practiced without some or all of these details. Further, well known features may not have been described in detail for the sake of clarity.

The example embodiments herein include computer-implemented methods, non-transitory computer-readable mediums, and systems. The computer-implemented methods can be executed, for example, by at least one processor that receives instructions from a non-transitory computer-readable storage medium. Similarly, systems consistent with the present disclosure can include at least one processor and memory, and the memory can be a non-transitory computer-readable storage medium. As used herein, a non-transitory computer-readable storage medium can include, for example, a memory stick or card, a flexible disk, hard disk, solid state drive, optical data storage medium such as a CD-ROM or DVD-ROM, or any other data storage medium, a RAM, a PROM, and EPROM, a FLASH-EPROM or any other flash memory, NVRAM, a cache, a register, any other memory chip or cartridge, and networked versions of the same. Singular terms, such as "memory" and "computer-readable storage medium," can additionally refer to multiple structures, such a plurality of memories or computer-readable storage mediums. As referred to herein, a "memory" can comprise any type of computer-readable storage medium unless otherwise specified.

A computer-readable storage medium can store instructions for execution by at least one processor, including instructions for causing the processor to perform steps or stages consistent with the embodiments described herein. Additionally, one or more computer-readable storage mediums can be utilized in implementing a computer-implemented method. The term "computer-readable storage medium" should be understood to include tangible items and exclude carrier waves and transient signals.

FIG. 1 depicts an example of a communication system 100 in which the management of network resources for multimedia communication as described herein may be implemented. System 100 can be, for example, a telephony system such as a hosted Private Branch Exchange (PBX) platform that provides voice and video over IP, fax services, etc. In some examples, one or more components of communication system 100, such as data centers 101, 102, and 103, can be used to implement computer programs, applications, methods, processes, or other software to perform the described techniques and to realize the structures described herein. Communication system 100 includes data centers 101, 102, and 103. Each data center is a point of presence (POP) that includes the network computing resources (e.g., servers, routers, switches, network connections, storage devices, etc.) for supporting the services provided by communication system 100. Each data center is typically located in a different geographical region.

In the example embodiment depicted in FIG. 1, communication system 100 includes three user points of data (pods), i.e., pods 1, 2 and 3, each of which is a logical grouping of two or more pod units situated in different data centers. Of course the number of pods may be greater or fewer in different configurations. Each pod serves a different subset of user accounts. In this example, each pod unit (e.g., unit 2A) serves the same subset of users as the other pod units within the same pod (e.g., pod units 2B and 2C). Each pod unit includes a communication server 119A-D configured to provide substantially the same services to the same subset of users as the other pod units within the same pod. Each pod unit also includes an account database 121*a*-121*g* configured to support the respective communication servers for the corresponding subset of users. It should be noted that the term "user" is being used in the interest of brevity and may refer to any of a variety of entities that may be associated with a subscriber account such as, for example, a person, an organization, an organizational role within an organization, a group within an organization, etc. As to be described later, communication servers 119A-D can be configured to implement techniques described herein for network resource management for multimedia communication.

Figure 2:
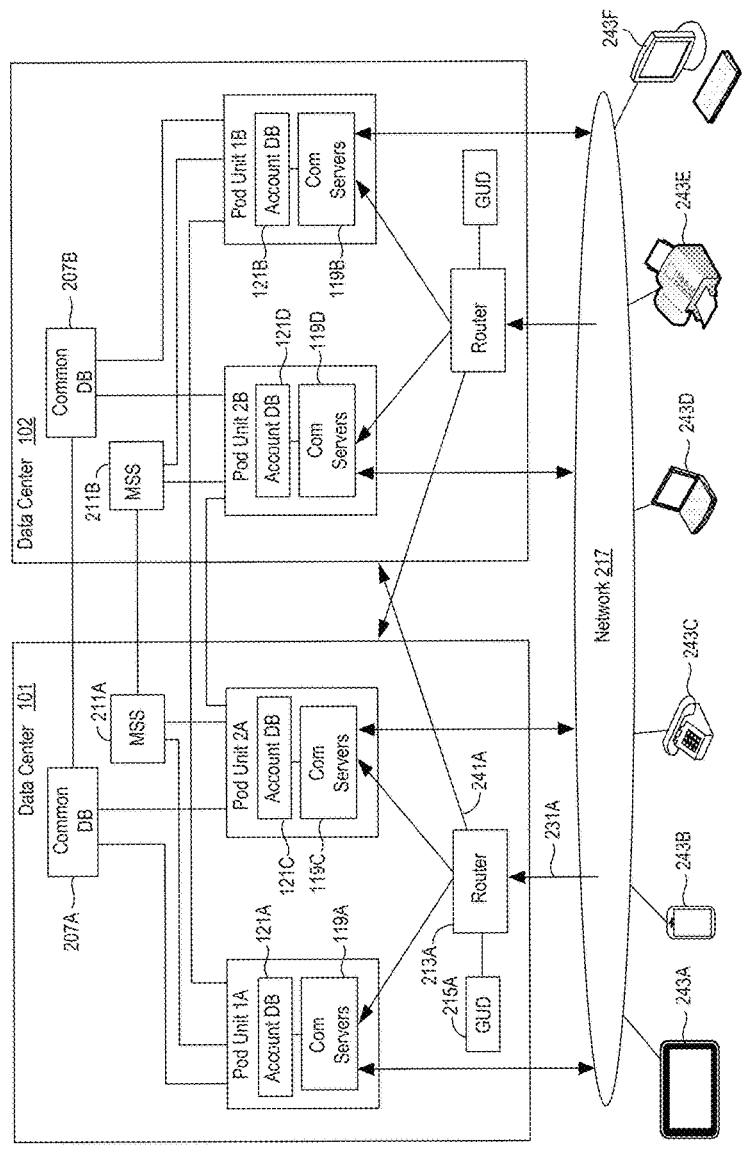

FIG. 2 shows various components of communication system 100 of FIG. 1. In some examples, one or more components of communication system 100, such as data centers 101 and 102, and/or communication endpoints 243A-243F can be used to implement computer programs, applications, methods, processes, or other software to perform the described techniques and to realize the structures described herein. Specifically, FIG. 2 shows the various interconnections within and between data centers 101 and 102. Both data centers are in communication with example network 217. Although FIG. 2 shows that network 217 as a single entity, it is understood that network 217 can include multiple sub-networks of different types, such as packet-based IP networks and public switched telephone network (PSTN). Service requests from various communication endpoints 243A-243F are routed through network 217 to either or both of the data centers. Communication endpoints 243A-243F represent a diversity of client devices that connect with a services system designed in accordance with one or more implementations as described herein. Such client devices include, for example (and without limitation), cell phones, smart phones, tablets, laptop and desktop computers, conventional telephones, VoIP phones, teleconferencing devices, videoconferencing devices, set top boxes, gaming consoles, etc. Reference to specific client device types should therefore not be used to limit the scope of the present disclosure.

Data center 101 includes pod units 1A and 2A, a common database (CDB) 207A, a message storage system (MSS) 211A, a router 213A, and a global user directory (GUD) 215A. Additional pod units (not shown) may also be included in data center 101. Data center 102 is similarly configured and includes components that operate substantially the same as those in data center 101. Data centers 101 and 102 provide backup and redundancy to one another in the event of failure.

Communication servers 119A-D provide multimedia services (e.g., VoIP, video, email, and/or facsimile) to subsets of users. Each of communication servers 119A-D may also provide other services including, for example, user account management and configuration, billing services, accounting services, etc. As to be described later, communication servers 119A-D provide network resources in response to receiving a service request 231A (e.g., a HTTP request, a SIP request, a RTP request, etc.) routed from router 213A. The network resources can be provided for the signaling and controlling of a multimedia communication session (e.g., a RTP session). The network resources can also be provided for processing of multimedia communication session. The processing can include, for example, buffering incoming data packets in a queue before processing the packets, transcoding audio packets using different codecs to reduce size of audio packets in light of network conditions, adding application-specific effects to the audio data (e.g., by adding a dial-tone to mimic a telephone call), encrypting the data, etc. Each pod unit also includes an account database (e.g., account database 121a) to support the communication server (s) for that particular pod unit, storing configuration details and other information regarding each user's account.

Pod units 1A and 1B are in communication with one another so that the data on their respective account databases are synchronized across data centers. Data center 101 includes router 213A to receive incoming service request 231A from network 217. Router 213A parses the incoming service request to identify or extract a user key which can be used to identify a user. The incoming service can also include other information. For example, a SIP request can include a telephone number of the called party, and router 213A can parse the service request to extract the telephone number. From the telephone number, router 213A can determine, for example, a geographical location associated with the requested service.

Using the extracted information, router 213A can query GUD 215A to determine which pod is associated with the user key and/or with the geographical location. Depending on the querying result, router 213A may route the service request to data center 101, or another data center (e.g., data center 102 as indicated by the arrow 241A).

Each pod unit of the data center 101 is also coupled to MSS 211A which stores files for the users served by pod units 1A and 2A. These files may include, for example, messages (e.g., voicemails and facsimiles), user logs, system messages, system and user call prompts (e.g., auto-attendant or user-recorded greetings), and other types of call-related or electronic messages. The contents of MSS 211A are synchronized with other data centers (e.g., synchronized with MSS 211B of data center 102).

In some embodiments, data centers 101 and 102 are configured to provide a predetermined quality of service for a multimedia session. As an example, in a case where VoIP telephony service is provided, data centers 101 and 102 can provide a predetermined quality of VoIP telephony service between at least two of communication endpoints 243A-243F. The quality of the VoIP telephony service is defined as a measurable level of telephony service delivered to the communication endpoints, depending on system and/or network configuration. In some examples, the quality can be affected by various metrics, such as digital signal processing capability of communication servers 119A-D. Moreover, network 217 can contribute to certain probability of packet loss, latency (or latency variation), jitter, burstiness of loss, or the like, which can be determined by the standards (e.g., LTE, 3G, etc.) and protocols (e.g., TCP/IP, ATM, etc.) associated with network 217. Moreover, the physical distances from data centers 101 and 102 to the communication endpoints 243A-243F can further exacerbate packet loss and latency, when the data packets are routed through a relatively long distance and through a large number of network elements. Furthermore, the processing capacity of communication servers 119A-D, as well as communication endpoints 243A-243F, also affect the speed of processing of the data packets transmitted through network 217. All of the aforementioned properties can influence the loss rate of data packets and perceived latency in transmission of audio/video data, which in turn affect the perceived quality of the VoIP telephony service.

Moreover, typically audio and video information are digitized and compressed with a particular codec into data packets for transmission over the network 217. As described above, communication servers 119A-D can transcode audio data using different codecs. Communication servers 119A-D can also encrypt the digitized audio and video information. The choice of codec can be driven by a tradeoff between quality and bandwidth requirement. As illustrative examples, G.729 codec operates at a lower bit rate and has low network bandwidth requirement, but offer inferior audio quality than, for example, G.711 and G.722 codecs, which operate at higher bit rates and offer better audio quality but and have higher network bandwidth requirement. Also, G.729 typically is more computation intensive than G.711 and G.722 codecs. On the other hand, the decision of encryption can also be driven by cost. Based on the available network bandwidth and computation power, communication servers 119A-D can be configured to switch between codecs or encryption schemas as they process the audio data packets.

Since there are multiple network elements (e.g., network 217, data centers 101 and 102, etc.) that can influence the quality of the provided multimedia service, the determination of a set of configurations for these elements to achieve a predetermined quality of service can involve trade-offs among the aforementioned metrics. For example, when router 213A determines which communication servers to route a request, the determination can be based on not only the geographic location associated with the request, but also the capacity (or availability) of the servers. Moreover, as discussed before, communication servers 119A-D buffer requests in a queue before processing and transmitting them. The communication servers 119A-D can each be configured to implement certain queue management policies. For example, the communication servers 119A can set priority to certain data packets, and even drop low-priority data packets when the queue depth (e.g., number of outstanding requests stored in the queue) reaches a certain level. Such management policies can increase the likelihood that high-priority data packets are processed first, and can prevent lower-priority data packets from clogging the network, which would otherwise cause loss of high-priority data packets. Moreover, as described before, the determination of choice of codec at the communication servers can also involve a trade-off between computation power, available network bandwidth, and packet loss.

Moreover, data centers 101 and 102 can be configured to provide a pre-determined quality of VoIP telephony service for a particular user. For example, a user who operates one of communication endpoints 243A-243F can subscribe to a specific calling plan under which the user is to be provided with a pre-determined quality of VoIP telephony service. Based on the calling plan, a certain cost can be allocated to providing the subscribed service. The calling plan and cost information can be part of user account information stored in account databases 121a-d. The determination of the configuration settings for the network elements can be based on the allocated cost as well.

In some embodiments, the determination of the configuration settings for the network elements in FIG. 2 to achieve a predetermined quality of multimedia service can be based on a weighted score and a weighted cost that reflects the aforementioned metrics. Reference is now made to FIG. 3A, which depicts a data structure 300 for storing a set of metrics related to the network and the servers, consistent with disclosed embodiments. As shown in FIG. 3A, data structure 300 includes tables 301 and 302. Table 301 associates a set of network and server metrics with a weight and a set of possible scores, with each score associated with a certain level of performance with respect to the processing and transmission of multimedia data. The score can reflect a predicted quality of multimedia service. In this example, a higher score indicates a higher predicted quality of service, and is mostly associated with data that indicates better performance.

For example, as shown in table 301 of FIG. 3A, the bandwidth of network (e.g., network 217) is associated with a weight of 20%. If the bandwidth of the network is less than 128 kbps, a score of "1" will be assigned. If the bandwidth of the network exceeds 128 kbps, a score of "2" will be assigned. Similarly, a network with lower latency and lower packet loss rate also has better performance, and is also assigned a higher score. The assignments of score reflect that a network with higher bandwidth, lower latency, and lower packet loss has a higher performance and can provide better quality of multimedia service (hence higher score). The combined weight (60%) also reflects that the network metrics exert a larger influence on the quality of multimedia service than other metrics.

Table 302 associates the server metrics with a weight and possible scores. At the server, a weight of 5% is assigned to CPU speed. A higher score is associated with a server with a larger processing power. Moreover, a weight of 20% is assigned to the choice of codec. As discussed before, G.722 and G.711 codecs offer better audio quality but require lower computation power, and for this particular example, they are assigned a higher score than G.729. There are other possible configurations related to codec that can affect the quality of service, such as sampling rate, compression rate, and transmission rate, which are not shown in FIG. 3A. These configurations can also be assigned weights to the aggregate score that reflects quality of service. Also, choosing servers that are closer to the endpoints can shorten the routing distance, and can improve the latency of packet transmission. Therefore, a choice of routing the request to a local server is assigned a higher score than a choice of routing the request to servers in other locations. Moreover, servers with smaller queue depth typically introduce less latency to the transmission of the multimedia data packets, and are therefore also assigned a higher score than servers with a larger queue depth.

The weights and scores of each metric are also associated with a time of creation. For example, as shown in FIG. 3A, the weights and scores are created on Aug. 5, 2015 (Wednesday) at 6 pm. As to be discussed later, the weights and scores can be used for estimation of quality of multimedia service at a later time, based on the time of creation. The example contents of data structure 300 are provided only for illustration purposes only, and do not limit the scope of the present disclosure.

The network and server metrics (e.g., bandwidth of 128 kbps, latency of 20 ms, etc.) as shown in FIG. 3A can be associated with a set of configuration settings to the network elements of FIG. 2. The configuration settings can include, for example, choices of data centers, networks, and PSTNs for processing and routing the multimedia traffic, configuration of the data centers for selection of codec and implementation of queue management policies, etc. Reference is now made to FIG. 3B, which depicts a data structure 320 for storing a set of configuration settings related to the network and the servers, consistent with disclosed embodiments. As shown in FIG. 3B, data structure 320 includes tables 321, 322, and 323, each including a set of server or network metrics measured on the date of Aug. 5, 2015 (Wednesday), at 6 pm, as indicated by field 324.

Table 321 associates a set of server metrics and available configurations with communication servers 119A and 119B of FIGS. 1 and 2. For example, as shown in Table 321, communication server 119A has a CPU speed of 1G and provides G.729 codec. Server 119A can also allow up to 300 requests to be queued for processing before dropping them, if the requests are associated with a particular calling plan A. Besides, at the time the measurement was made, there were 250 requests in the queue of server 119A. On the other hand, server 119B has a higher CPU speed, provides G.722/G.711 codec (which are of higher performance), but will allow only up to 100 requests of calling plan A to be queued before dropping them. At the time the measurement was made, there were 50 requests in the queue of server 119B.

As shown in table 321, each server is also associated with a cost, which can reflect a measurement of the operation cost incurred to provide the multimedia service with the server. In this particular example, communication server 119B, which has higher performance and can provider higher quality of multimedia service, is associated with a higher cost than communication server 119A.

Table 322 associates a set of network metrics and costs with PSTNs A and B, each provided by a different provider and form part of network 217 of FIG. 2. As shown in table 322, the part of network controlled by each provider can be associated with a certain voice-traffic load, represented by a unitless number, and cost. As an illustrative example, PSTN A experiences a lighter voice-traffic load, and is associated with a higher cost than PSTN B, which experiences a heavier voice-traffic load.

Table 323 associates a set of network metrics and costs with networks C and D, which can be part of network 217 of FIG. 2. Networks C and D can be of different types (e.g., WiFi, wired-LAN, etc.), and each is associated with different metric values. As an illustrative example, network C has a lower bandwidth, a higher latency and a higher packet loss rate than network D, and is associated with a lower cost. The example contents of tables 321-323 are provided only for illustration purposes only, and do not limit the scope of the present disclosure.

A determination of configuration settings to be applied to the network elements of FIG. 2, in order to achieve a requisite quality of multimedia service, can be made based on the information from FIGS. 3A and 3B. For example, different combinations of communication servers (e.g., servers 119A and 119B), PSTNs (e.g., PSTNs A and B), and networks (e.g., networks C and D) can be selected. Each combination is associated with a specific value of a specific network metric according to FIG. 3B (e.g., a combination that includes network C will have a network latency of at least 30 ms, a combination that includes communication server 119A will have a CPU speed of 1G, etc.), and the network metric value of that combination is then associated with a score and a weight of contribution to the aggregate score that represents quality of multimedia service according to FIG. 3A. The aggregate score for each combination can then be calculated. Moreover, each combination is also associated with an aggregate cost. A certain combination, which can include both a choice of route for the multimedia data (e.g., to choose communication server 119A instead of 119B, to set a switch to route all the media traffic to network D instead of network C, etc.) and a choice of setting (e.g., to configure communication server 119B to use a certain codec, to configure the sampling rate, compression rate and transmission rate of the codec, and/or to implement a queue management policy, etc.), can be selected based on the aggregate cost and score.

As an illustrative example, to establish a VoIP session, a combination can be selected such that it can achieve an aggregate score that is above a certain threshold, which represents a requisite quality of multimedia service, at a minimum cost among the available combinations. The selection of the configuration settings can be driven by other factors. For example, if the parties to the VoIP session subscribe to the calling plan A, it may be undesirable to choose communication server 119B, which (as discussed before) allows less requests from calling A to be queued, and therefore is more likely to drop packets associated with calling plan A than communication server 119A.

The values of the network and server metrics in FIG. 3B (e.g., latency, packet loss rate, etc.), as well as their effects on the quality of multimedia service as reflected by the weights and scores in FIG. 3A, can be measured in real-time, or estimated based on historical measurements.

There are various methods and protocols available to perform the measurement, such as Real-time Control Protocol (RTCP), an IETF (Internet Engineering Task Force) defined protocol for providing out-of-band statistics and control information for an RTP session. The protocol provides periodic transmission to participants of an RTP session various packets, such as sender report, receiver report, etc. The receiver report can include information such as transmitted RTP packet counts, lost packet counts, jitter, round-trip delay time, etc. Moreover, the measurement can also be performed by intercepting RTP packets, or by acquiring network latency statistics at some of the network elements (e.g., Router 213A of FIG. 2). In some embodiments where firewalls exist between different sub-networks, dedicated software and hardware components (e.g., network probe) can be installed to provide network traffic data through the firewalls. For example, such probes can be installed by the PSTN providers to provide voice-traffic load information within the portion of the PSTN controlled by the providers.

The network and server metrics can be measured after applying some of the configuration settings and choice of routing of FIG. 3B to the network elements of FIG. 2. For example, referring back to FIG. 3B, the voice-traffic load of PSTN A and the network metrics of network C can be measured after routing the multimedia traffic through PSTN A and network C. The queue depth of communication server 119A can also be measured after selecting the server to process the multimedia traffic and configuring the server to implement a particular queue management policy (e.g., allowing a maximum of 300 requests to be queued for calling plan A) and to use a particular codec (e.g., G.729). The network and server metrics data can also be associated with a particular geographical location to account for the effect of, for example, proximity of the network elements to the endpoints. In some embodiments, in addition to applying the configuration settings and choice of routing, a test signal can also be injected into the network, and the network and server metrics can be measured based on the transmission of the test signal through the network elements.

The aforementioned real-time measurement of the metrics can also be stored in a database, which can be retrieved later as historical measurement of the metrics. Historical values of network and server metrics can be used to estimate the network and server metrics at a current time if, for example, there is a repeating pattern of network conditions. Accordingly, the historical values can be updated by the real-time measurement of the metrics, providing for a dynamic estimate of the network conditions. For example, referring back to FIG. 3B, the server and network metrics were measured on Aug. 5, 2015 (Wednesday) at 6 pm. The values of these metrics can be useful for estimating the metrics on a future weekday at a time close to 6 pm, if it can be shown that similar network conditions occur (e.g., due to a repeating pattern of multimedia traffic) on every weekday at a time close to 6 pm. Such a repeating pattern can be due to, for example, typical pattern of network usage. For example, it may be common to have heavier multimedia service usage at a time when people return from work or school, on a daily basis during the weekdays. Such a repeating pattern allows a determination that the values of the server and network metrics on a given Wednesday at a time close to 6 will be very similar to the historical values measured on Aug. 5, 2015 at 6 pm.

Moreover, to further improve the accuracy of estimation, a statistical model can be created to reflect a repeating pattern of network conditions for each combination of configuration setting and choice of route. Referring back to the example above, the historical values of network and server metrics can be collected within a period of time (e.g., 6 months), for each combination of PSTN, communication servers, and networks as listed in FIG. 3B. The values of the metrics can be analyzed between various intervals of time (e.g., between 24 hours, a week, etc.). The analysis can include computing various forms of statistical representation of the data, such as averages and variances of the metrics between the intervals, as well as mathematical formulae to model a repeating pattern of network conditions as reflected by these metrics, etc. The statistical values can also be extrapolated to cover times and days for which historical measurements are not available. The statistical model can also be validated by real-time data. Similarly, a history of determination of the weights and scores associated with each server and network metrics (for the calculation of aggregate score that reflects quality of multimedia service), as shown in FIG. 3A, can also be collected over a period of time and statistically analyzed between intervals.

In some embodiments, a combination of a history of server and network metrics, and a history of their contributions to the aggregate score, can be used to estimate, at a given time, the estimated quality of multimedia service for each combination of choice of route and configuration settings as shown in FIG. 3B. Determination of configuration settings and choice of route can then made based on, for example, the estimated quality of multimedia service associated with the settings and choice of route, and/or based on other factors (e.g., the cost incurred in enforcing the settings and choice of route). As an illustrative example, to establish a VoIP session on a Wednesday at 6 pm, a combination of settings (e.g., choice of PSTN, network, choice of communication server and the associated setting, etc.) can be selected such that, based on the historical measurement and statistical models of the network and server metrics associated with the PSTN, network, and communication server, and their associated weights and scores, the expected aggregate score is above a certain threshold, and the cost is at a minimum among the available combinations.

In some embodiments, the statistical analysis of the historical measurements of the network and server metrics (and the associated weights and scores) can be based on other conditions in addition to or in lieu of timing relationship. For example, a set of configurations (and/or choice of route) can be associated with a history of changes of network and server metrics (e.g., network latency, queue depth at server, etc.) in response to the application of the configurations. As an illustrative example, during a prior VoIP session, network C and communication server 119A were used to transmit and process the multimedia data for the session. At that time, network C was experiencing an average latency of 40 ms and an average packet loss rate of 15%, with the server configured to use G.711 codec to process the multimedia data, and the codec is operated at a certain sampling rate, compression rate, and/or transmission rate. After configuring the server to use G.729 codec and operating G.729 codec at a certain sampling rate, compression rate, and/or transmission rate, however, the average latency and average packet loss rate at network C improved to, respectively, 20 ms and 5%. The change in average latency and packet loss rate can be associated with the codec setting at communication server 119A. Later, when a new VoIP session is to be established under similar conditions at network C (e.g., with a latency of 40 ms and packet loss rate of 15%), a determination can then be made to configure communication server 119A to use the G.729 codec based on the historical change in the average latency and packet loss rate at network C in response to the codec setting, to bring out the expected improvements in these metrics at network C for the new VoIP session.

Moreover, in some embodiments, a historical set of configurations (and/or choice of route) with the associated network and server metrics can further be associated with other information specific to a particular user, such as the calling plan the user subscribes to, and the location of the user, etc. As an illustrative example, a set of configurations that were used for a prior VoIP session can be stored and associated with the user, the calling plan the user subscribes to, and/or the location of the user. The set of configurations can then be retrieved for the next VoIP session that involves the same user, the same calling plan, or other users within the same locale, if the new VoIP session operates under similar network conditions as the prior VoIP session, as reflected by the real-time measurement of the network and server metrics before or during the new VoIP session.

The determination of configuration settings based on the aforementioned historical relationship between the settings and the metrics can be overridden dynamically by real-time measurement of the metrics, to reflect the latest network and operation situations. As an illustrative example, there is a severe shortage of network bandwidth at network 217, but an abundance of capacity at communication servers 119A-D, both of which can be determined based on real-time measurement of latency at network 217 and CPU speed at servers 119A-D shortly after a set of configuration settings is applied to the network elements of FIG. 2. Since under the latest network conditions, it becomes prohibitively costly to use the G.722 or G.711 codec, which can take up huge network bandwidth but uses relatively less computation power than G.729 codec. In that case, the cost associated with G.722 or G.711 codec can be assigned to be higher than that of G.729 codec. With such arrangements, only multimedia communications associated with users who subscribe to a calling plan with higher allocated cost can use G.722 or G.711 codec at communication servers 119A-119D.

Moreover, the historical relationship between the quality of multimedia service and configuration settings, such as the weight of service score contributed by the settings, can also be updated with real-time measurement of the metrics. For example, when there is a severe shortage of network bandwidth at network 217 but an abundance of capacity at communication servers 119A-D, the choice of codecs (which can involve trade-off between network latency and computation efficiency) can affect the quality of multimedia service to a different extent than in a situation where there is abundance of network bandwidth at network 217 but a shortage of capacity at communication servers 119A-D. The weights of contribution by each network element to the aggregate score that reflects multimedia service quality can then be updated accordingly. In this particular case, the weight of the server metrics can be increased, while the weight of the network metrics can be reduced.

As to be described below, data structure 300 can be part of a network resource management system, which has visibility over the operating conditions of each network element that can contribute to or affect the perceived quality of multimedia services. The network resource management system can be configured to use data structure 300 to calculate the scores and costs associated with a set of configuration settings for different combinations of network elements configured to transmit the multimedia data, and update data structure 300 if the score and cost no longer reflect the latest operation conditions.

Figure 4:
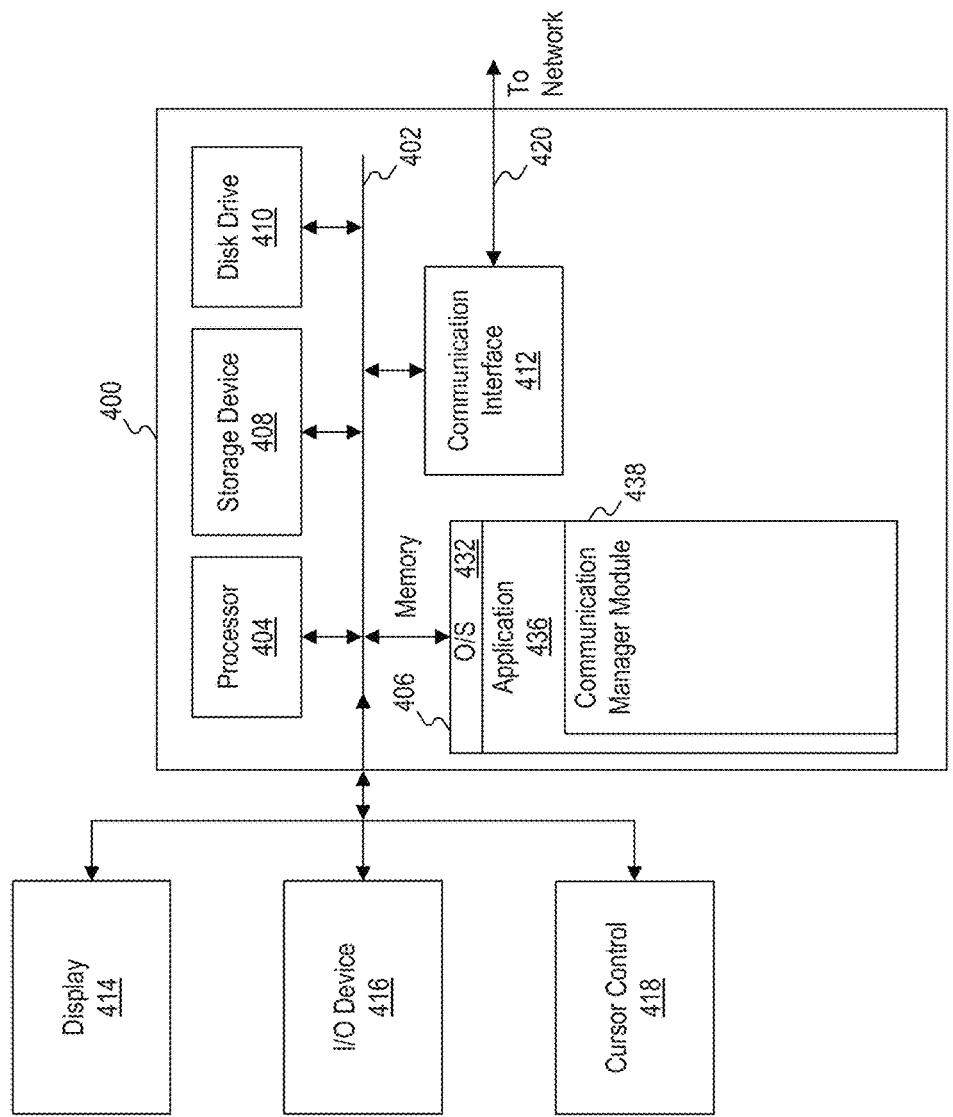
FIG. 4 is a diagram of an example system architecture for implementing embodiments consistent with the present disclosure.

FIG. 4 is a block diagram of an example system 400. System 400 can be part of a communication device that is used in a communication system and that can function as any of the communication devices depicted in FIG. 2 (e.g., communication endpoints 243A-243F, communication servers 119A-119D, router 213A, etc.), as well as the aforementioned network resource management system, with techniques consistent with embodiments of the present disclosure.

System 400 includes a bus 402 or other communication mechanism for communicating information. Bus 402 interconnects subsystems and devices, such as one or more processors 404, system memory ("memory") 406, storage device 408 (e.g., ROM), disk drive 410 (e.g., magnetic or optical), communication interface 412 (e.g., a modem, Ethernet card, or any other interface configured to exchange data with a communications network), display 414 (e.g., CRT or LCD), input device 416 (e.g., keyboard), and pointer cursor control 418 (e.g., mouse or trackball).

According to some examples, computer system 400 performs specific operations in which processor 404 executes one or more sequences of one or more instructions stored in system memory 406. Such instructions can be read into system memory 406 from another computer readable medium, such as static storage device 408 or disk drive 410. In some examples, hard-wired circuitry can be used in place of or in combination with software instructions for implementation. In the example shown, system memory 406 includes modules of executable instructions for implementing an operation system ("O/S") 432, an application 436, and a communication manager module 438, which can provide the functionalities disclosed herein.

In some examples, execution of the sequences of instructions can be performed by a single computer system 400. According to some examples, two or more computer systems 400 coupled by communication link 420 (e.g., links to LAN, PSTN, or wireless network) can perform the sequence of instructions in coordination with one another. Computer system 400 can transmit and receive messages, data, and instructions, including program code (i.e., application code) through communication link 420 and communication interface 412. Received program code can be executed by processor 304 as it is received, and stored in disk drive 410, or other non-volatile storage for later execution.

In some examples, where system 400 is part of the network resource management system, storage device 408 can store data structure 300 of FIG. 3, and the associated network element configuration settings. Application 436 can receive a request for network resources for a communication session (e.g., an RTP session) via bus 402 and communication interface 412. If a participant to the session has subscribed to a certain quality of service for the session, application 436 can then determine a set of configuration settings expected to achieve the subscribed quality of service, based on the association between the metrics stored in data structure 300 and the pre-stored network element configuration settings. Application 436 can also collect RTCP receiver reports via bus 402 and communication interface 412 for a measurement of the latest network conditions after applying the determined configuration settings, and update data structure 300 accordingly. In some embodiments, as described above, a plurality of network probes can be employed to collect the RTCP receiver reports and then transmit the reports to system 400.

Figure 5A:
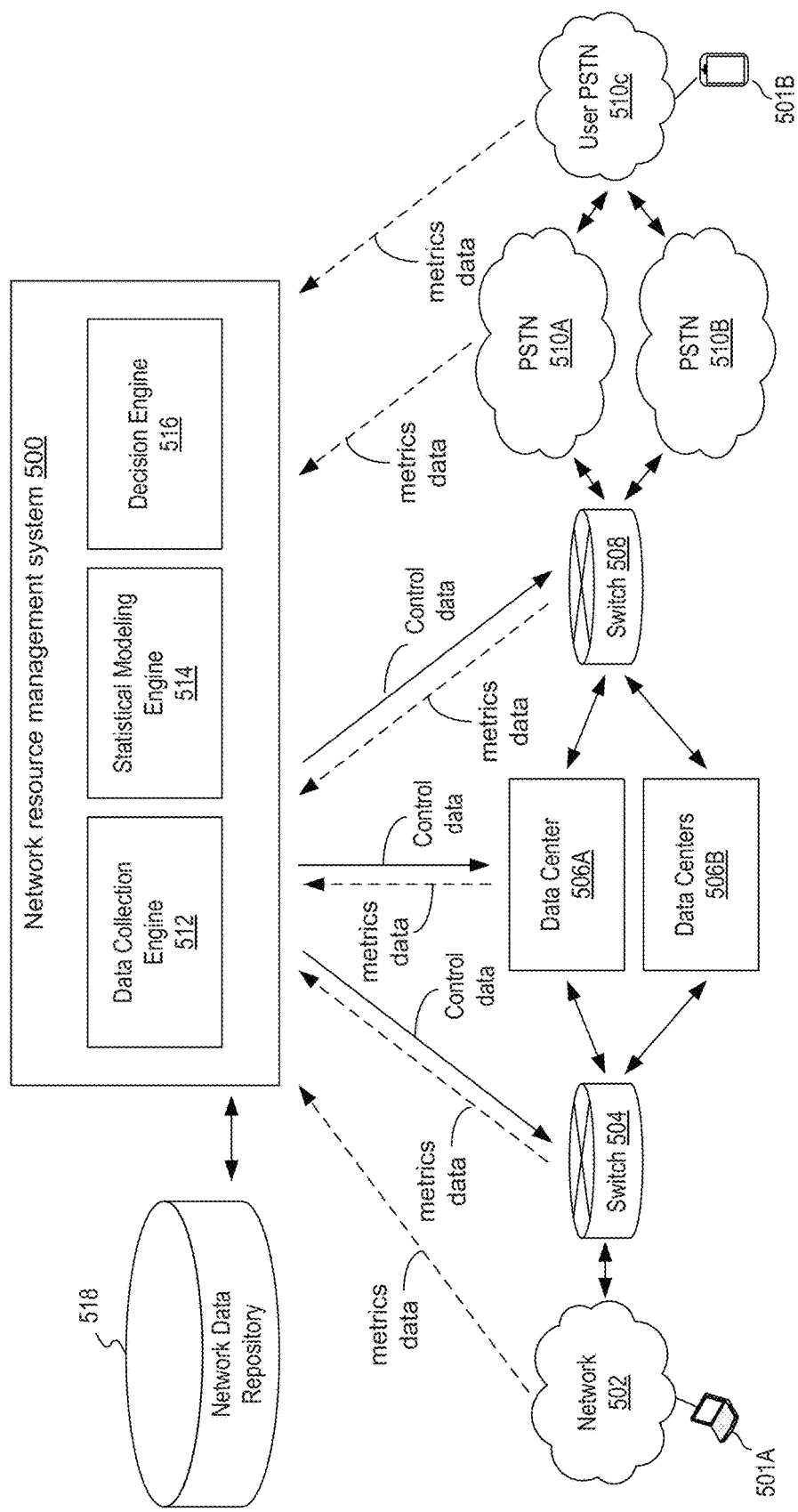
FIGS. 5A-5D are component diagrams of an example system environment for providing and managing network resources for multimedia service, consistent with disclosed embodiments.

FIG. 5A is a simplified block diagram of an example network resource management system 500 for determining routing information for a network request, consistent with disclosed embodiments. As shown in FIG. 5A, network resource management system 500 is communicatively connected with various network elements between communication endpoints 501A and 501B, including network 502, switch 504, data centers 506A and 506B, switch 508, PSTNs 510A and 510B, and user PSTN 510C. Endpoints 501A and 501B can be any of the endpoints of FIG. 2. In a case where a VoIP session is established under RTP between endpoints 501A and 501B, network 502 can be an IP network, while switch 504 can include an access border control (SBC) and a SIP proxy and registrar. Switch 504 can be configured to route the media data to at least one of data centers 506A and 506B, or to other data centers or to other network elements not shown in FIG. 5A. Data centers 506A and 506B can be implemented as data centers 101 and 102 of FIG. 2, and can include various communication servers configured to route and process the media data for the VoIP session. Switch 508 can include an interconnect SBC and a PSTN gateway configured to route the processed media data from one of data centers 506A and 506B to one of PSTNs 510A and 510B, from which the voice data can be routed to endpoint 501B through user PSTN 510C.

As shown in FIG. 5A, network resource management system 500 can control the settings of switches 504 and 508 and data centers 506A and 506B. The control can be for the routing of the multimedia data (e.g., choice of selecting between data centers 506A and 506B to process the data, choice of selecting between PSTNs 510A and 510B, etc.). Network resource management system 500 can also change the setting of at least some of the network elements shown in FIG. 5A (e.g., configuring switch 504 to route the multimedia data traffic to one of data centers 506A and 506B, selecting the codec and queue management policy at the selected data center, etc.). Network resource management system 500 can manage the routing and configuration settings to achieve a predetermined quality of service for the VoIP session.

As shown in FIG. 5A, network resource management system 500 includes a data collection engine 512, a statistical modeling engine 514, and a decision engine 516. Each engine can either be a software program that performs a particular function of related functions, or a packaged functional hardware unit designed for use with other components. Data collection engine 512 can collect network and service metrics data that reflect the latest network conditions from each network elements between endpoints 501A and 501B, including elements that are not under the control of network resource management system 500. As discussed before, the data can include RTCP receiver reports, which can include transmitted RTP packet counts, lost packet counts, jitter, round-trip delay time, etc. The data can also come from network probes installed in network 502, PSTNs 510A and 510B, and user PSTN 510C. Data collection engine 512 will be described in detail with respect to FIG. 5B.

The real-time data can then be provided to statistical modeling engine 514, which can use previously-collected real-time data to construct a statistical model for estimating the perceived quality of the VoIP service. The statistical model can be constructed using a historical measurement of network and server metrics as shown in FIG. 3B, and a history of the associated contributions to the aggregate multimedia service score as shown in FIG. 3A. The statistical model can be constructed based on time (e.g., to reflect repeating patterns of network conditions due to repeating patterns of multimedia traffic), based on configuration settings (e.g., to reflect the historical effect on the network and server metrics of applying the settings), and/or based on other information (e.g., different types of calling plans), as discussed above with respect to FIGS. 3A and 3B. The model can also be updated dynamically based on real time metrics data. Statistical modeling engine 514 will be described in detail with respect to FIG. 5C.

The real-time data, as well as the statistical model, can then be provided to decision engine 516, which can determine a set of configurations for various network elements in FIG. 5A to provide a quality of VoIP service between communication endpoints 501A and 501B. As discussed before with respect to FIGS. 3A and 3B, the decision can be driven by different factors, such as cost, a target level of quality of multimedia service, the calling plan subscribed the parties to the VoIP session, etc. Within these constraints, a set of configuration settings (including choice of routing) can be determined to achieve the target level of quality of multimedia service. The determination can be based on the statistical model provided by statistical modeling engine 514. For example, as discussed before, the choice of route can be made based on the historical measurement of the network and server metrics along the route, which allows an estimation of the quality of multimedia service provided by the route based on a relationship between the time of the current VoIP session and the time (or over a period of time) when the historical measurements were made. Moreover, the configuration settings can also be determined based on historical changes in the network and server metrics (and the associated quality of multimedia service score) in response to pre-stored configuration settings, if the same change is to be effected on the VoIP session. Furthermore, as discussed above, a configuration settings used for a prior VoIP session can also be reused for the new VoIP session if, for example, the new VoIP session operates in similar network conditions as the prior VoIP session. But the decision can also be overruled based on real-time data, as to be described later. Decision engine 516 can then transmit the configurations to the network elements. Decision engine 516 will be described in detail with respect to FIG. 5D.

The real-time data, the statistical models, as well as the pre-stored configuration settings, can also be deposited in a network data repository 518 of FIG. 5A, which can provide historical data (e.g., previous-collected real-time data as discussed before, and history of configurations for each VoIP session, etc.) to statistical modeling engine 514, which can use the historical data to construct and update the statistical model. In some embodiments, network data repository 518 can be organized with an Apache™ Hadoop® File System (HDFS).

Figure 5B:
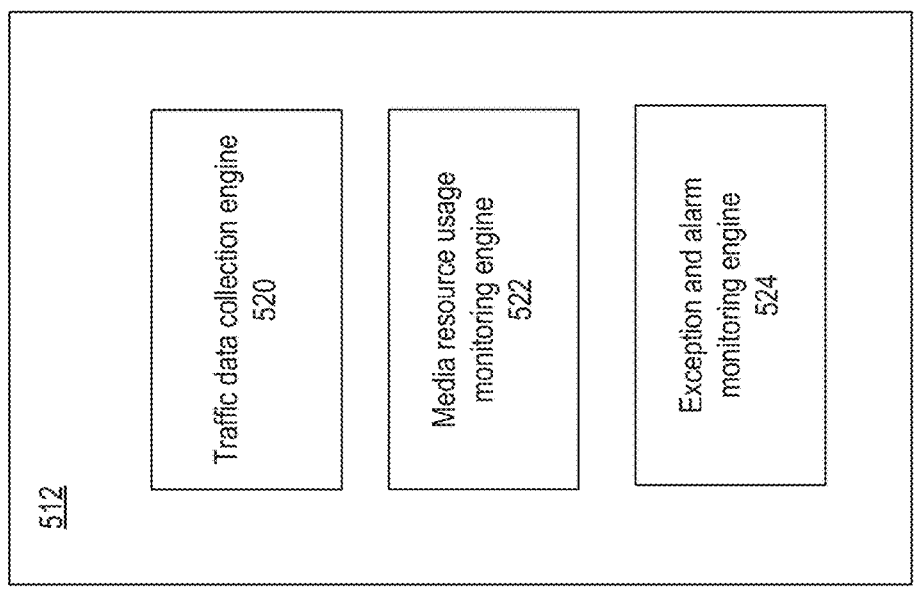

FIG. 5B is a component diagram illustrating an example data collection engine 512 of FIG. 5A, consistent with disclosed embodiments. As shown in FIG. 5B, data collection engine 512 includes traffic data collection engine 520, media resource usage monitoring engine 522, and exception and alarm monitoring engine 524, all of which can be implemented as software components or packaged functional hardware unit.

In some embodiments, traffic data collection engine 520 can collect real-time data that reflect network conditions. Such data can include (but is not limited) to RTCP receiver reports, which can include information such as transmitted RTP packet counts, lost packet counts, jitter, round-trip delay time, etc., and are broadcasted by the participants of a RTP session. In some embodiments, traffic data collection engine 520 can also directly intercept the RTP packets to deduce this information, instead of acquiring them from the RTCP receiver reports. The data can also be acquired from other network elements, such as switches 504 and 508 of FIG. 5A, as well as routers (e.g., router 213A of FIG. 2) within data centers 506A and 506B, and from network probes installed in network 502, PSTN 510A and 510B, and user PSTN 510C. The data collected can then be associated with a timestamp that indicates the time of collection, and can be stored in network data repository 518.

In some embodiments, media resource usage monitoring engine 522 can collect server metrics data, which can reflect a capacity of the servers (e.g., communication servers 119A-D) of data centers 506A and 506B in handling media data for a VoIP session. The data can include, but is not limited to: current number of media sessions on the media processor card, the current command/response times of each media processor card, a queue depth representing a number of outstanding media packets on each media processor cards, capacity and congestion of links that carry the media data into and out of the servers, etc. All of these metrics can affect the delay and loss rate of the VoIP data packet transmission and the perceived quality of VoIP service provided. For example, as discussed before, when queue depth meets a certain value, the server may drop low priority packets, which increases the loss rate and can affect the perceived quality of VoIP service associated with these packets. The capacity data collected is then associated with a timestamp indicating the time of collection, and is stored in network data repository 518.

In some embodiments, exception and alarm monitoring engine 524 receives information about current alarms, errors, or exceptions occurring internal or external to the network elements of FIG. 5A. Such information can include, for example, out-of-service messages indicating that a switch, a server, or even part of a network is out-of-service. Such information can be used by, for example, decision engine 516 to update its decision or resolution about the configuration settings to be transmitted to the network elements. For example, based on the network and server metrics, decision engine 516 determines a certain media path including data center 506A. But if alarms, errors or exceptions are detected from data center 506A (e.g., some or all of the communication servers in data center 506A are down), decision engine 516 can then update the media path determined to, for example, switch to data center 506B, if no alarm, error or exception is detected from that data center. The alarms, errors, or exceptions can be detected either before or during the VoIP session, such that the media path can be updated accordingly either before or in the middle of a VoIP session.

Figure 5C:
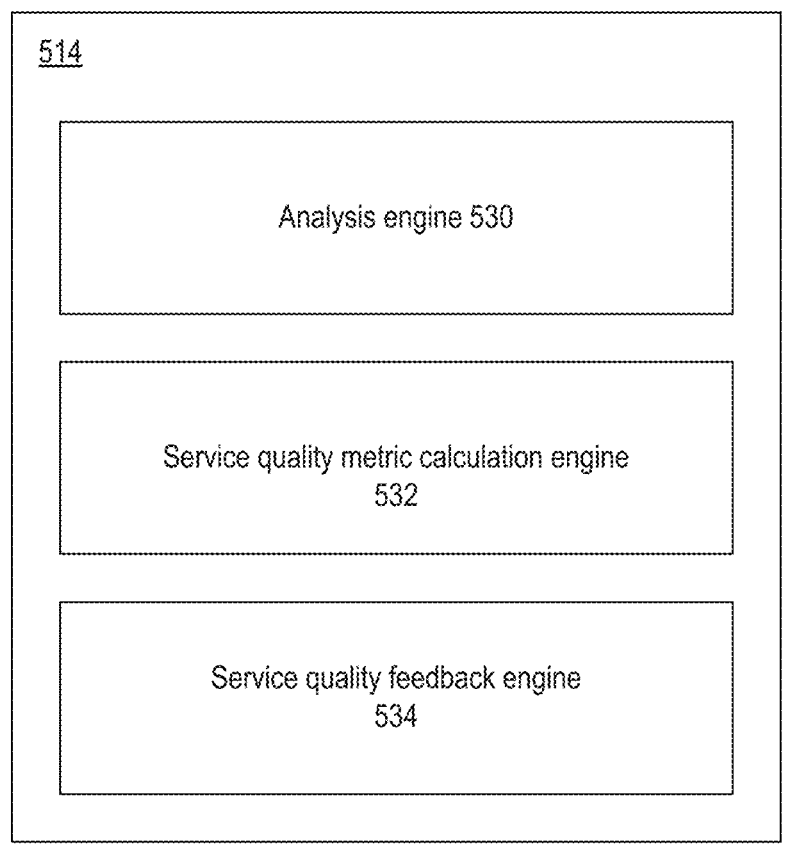

FIG. 5C is a component diagram illustrating an example of statistical modeling engine 514 of FIG. 5A, consistent with disclosed embodiments. As shown in FIG. 5C, statistical modeling engine 514 includes analysis engine 530, service quality metric calculation engine 532, and service quality feedback engine 534, all of which can be implemented as software components or packaged functional hardware unit.

In some embodiments, metrics analysis engine 530 is configured to perform statistical analysis on the real-time data received from traffic data collection engine 520 and media resource usage monitoring engine 522. The data can be bucketed based on the timestamp associated with the data. Statistical analysis can be performed on the data over a period of time to look for, for example, repeating patterns of network conditions, repeating patterns of volume of multimedia traffic, etc. Analysis engine 530 can then determine various forms of statistical representation of the metrics, such as the averages and variances of the network and server metrics, as well as modeling formulae that reflect the change of network and server metrics with respect to time, etc. Analysis metric engine 530 can also associate the statistical representations of the metrics with the configuration settings (e.g., choice of routes, settings at switches 504 and 508 and data centers 506A and 506B, etc.), and/or with other information such as identify of the user to the VoIP session when the metrics data are collected, the calling plan subscribed by the user, the location of the user, etc.

Service quality metric calculation engine 532 is configured to estimate an expected quality of service based on an output of analysis engine 530. Service quality metric calculation engine 532 can retrieve the historical network and server metrics data, and apply the data to data structure 300 of FIG. 3A to determine the quality of multimedia service score. In some embodiments, the determination of the score can be performed periodically, or triggered by the reception of network conditions data (e.g., whenever a RTCP receiver report is received), and does not require a particular VoIP session to be established. In some embodiments, the determination of the score can be triggered by a request to establish VoIP session, and the historical network and server metrics data can be retrieved based on, for example, the time of the VoIP session (for repeating pattern of network conditions), the network conditions under which the VoIP session is to be operated, the identities of the parties of the VoIP session, the location of the endpoints, or the like.

In some embodiments, service quality feedback engine 534 provides real-time feedback to service quality metric calculation engine 532. After a VoIP session is established and a set of configuration settings are applied by decision engine 516, the network and server metrics data can be collected again in real-time, and applied to the data structure 300 of FIG. 3 to re-determine the score. Service quality feedback engine 534 can then associate between the score and the set of configuration settings, and store the association in repository 518. The association between the score and the configuration settings can also be bucketed according to time and/or geographical location. In some embodiments, service quality feedback engine 534 can also update the weights of the metrics of data structure 300 of FIG. 3A based on the latest network and operation condition. For example, if service quality feedback engine 534 detects that the choice of codec does not affect the perceived quality of service (as reflected by the network metrics data such as packet loss rate and latency) to the extent indicated by the weight of the codec metric of data structure 300 of FIG. 3A, service quality feedback engine 534 can lower the weight accordingly.

Figure 5D:
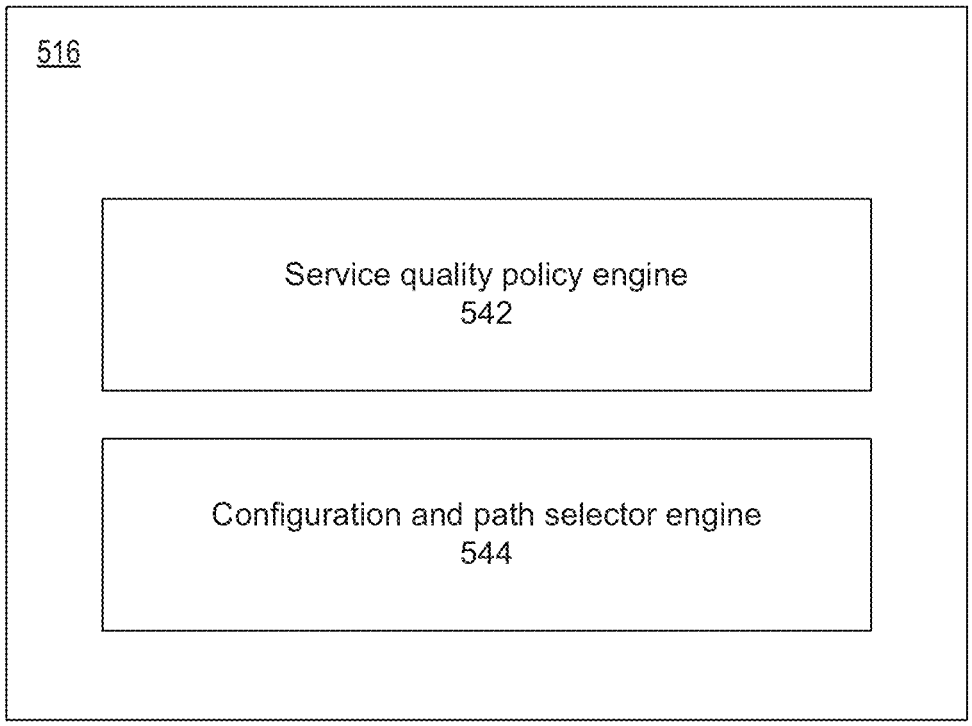

FIG. 5D is a component diagram illustrating an example of decision engine 516 of FIG. 5A, consistent with disclosed embodiments. As shown in FIG. 5D, decision engine 516 includes service quality policy engine 542, and configuration and path selector engine 544, all of which can be implemented as software components or packaged functional hardware unit.

In some embodiments, service quality policy engine 542 is configured to provide one or more constraints to be applied when selecting a set of configurations (which can also include selecting a path for routing the media data) for a given VoIP session. The constraints can include, for example, a pre-determined quality of VoIP service to be provided to a particular user, the maximum allocated cost associated with a VoIP service to be provided to that user, etc. Such constraints can serve to provide direction on the quality of VoIP service to be provided.

Within these constraints, configuration and path selector engine 544 can determine, after receiving a request to establish a VoIP session, a path and/or a set of configuration settings. In some embodiments, the determination can be based on the statistical model provided by statistical modeling engine 514 and the time of the VoIP session. For example, the statistical model can show that on a weekday at 6 pm, the mean queue depth at the communication servers at data center 506A is expected to be lower than the mean queue depth at the communication servers at data center 506B, and the voice-traffic load at PSTN 510A is heavier than the load at PSTN 510B. Therefore, if the VoIP session is to be established on a weekday at 6 pm, configuration and path selector engine 544 can select data center 506A and PSTN 510B to route the call.

In some embodiments, configuration and path selector engine 544 can also determine the configuration settings based on historical changes in network and server metrics in response to prior configuration settings and the current network conditions. For example, data reflecting current network conditions, under which the VoIP session is to be operated, can be collected by traffic data collection engine 520 and media resource usage monitoring engine 522. Configuration and path selector engine 544 can then retrieve, from network data repository 518, prior configuration settings that bring about an improvement in the quality of service score from prior network conditions similar to the current conditions, with the expectation that those configuration settings can bring out similar improvements for the VoIP session.

As an illustrative example, in a prior VoIP session, the change of codec from G.722 (which is less computation intensive but requires higher bit rate) to G.729 (which is more computation intensive but requires lower bit rate) improves the latency at network C from 30 ms to 10 ms. If the new VoIP session also operates through network C, and that the current latency at network C is also 30 ms, configuration and path selector engine 544 can change the codec from G.722 to G.729 with the expectation to improve the latency at network C from 30 ms to 10 ms, and that the quality of service score will also be improved accordingly.

In some embodiments, configuration and path selector engine 544 can also determine a set of candidate configuration settings based on an association between prior configuration settings and other information, such as the identity of the user to the VoIP session, the calling plan subscribed by the user, the location, etc. As an illustrative example, the same configuration settings can be applied to any VoIP session involving the same user, or users in the same location, etc.

After configuration and path selector engine 544 determines a set of candidate settings, the settings can be further filtered under the constraints provided by service quality policy engine 542 (e.g., cost). For example, features that are of high operating cost and do not contribute substantially to the quality of service (e.g., encryption) can be turned off. Among the filtered settings, the setting (and/or selection of a path) that gives rise to the highest score can then be selected for the VoIP session. In a case where a score or a setting is not available for a given time, a score and a setting associated with a time closest to the given time can be used instead.

As discussed before, the determination of configuration and path selector engine 544 can be overridden by information from exception and alarm monitoring engine 524. If an exception or an alarm is detected in the middle of a VoIP session, configuration and path selector engine 544 can update and retransmit the configuration settings, to reduce the effect of unexpected network conditions on the VoIP session.

Figure 6:
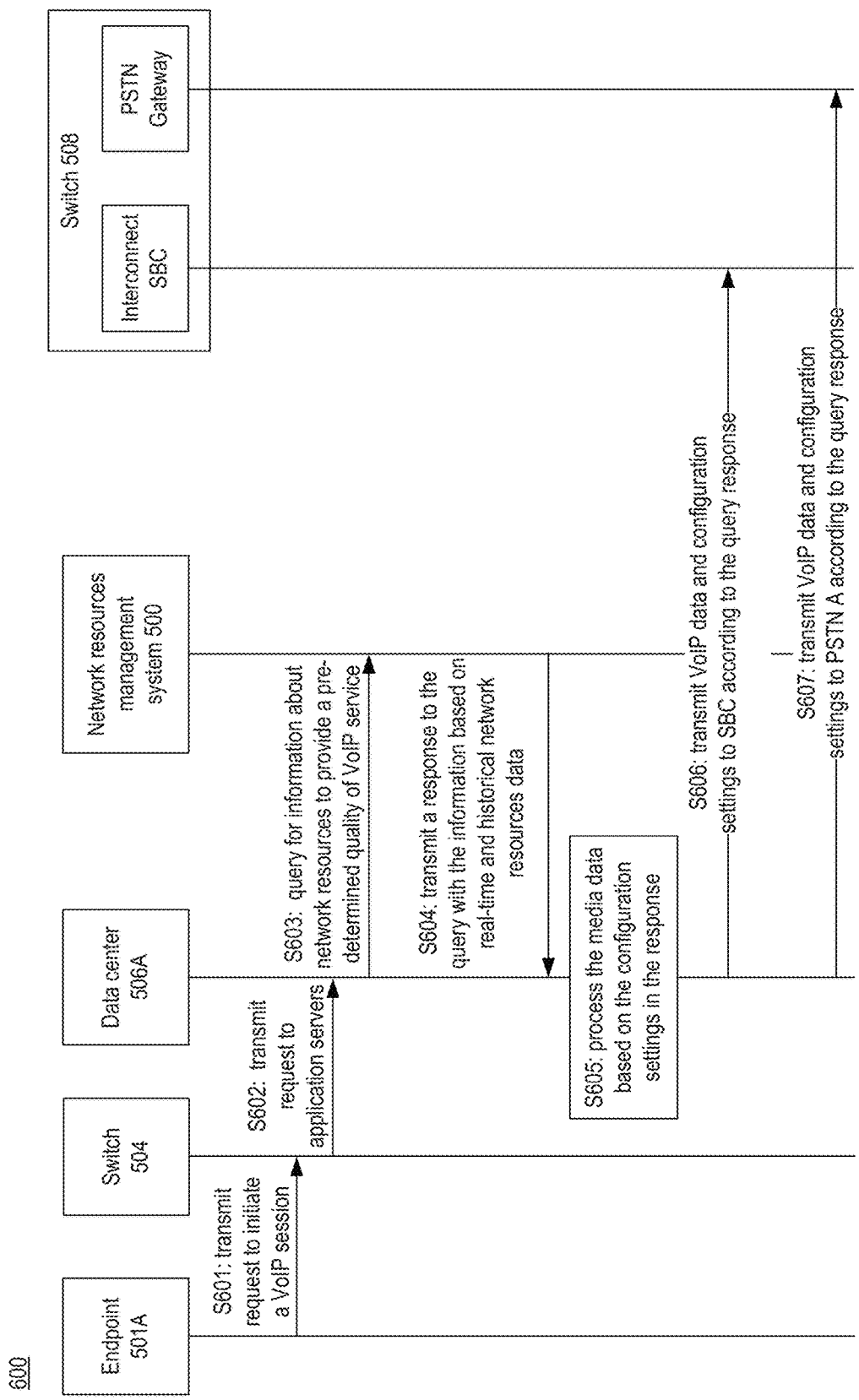
FIG. 6 is a chart illustrating an example of a method for managing network resources for multimedia services based on real-time and historical data, consistent with disclosed embodiments.

FIG. 6 is a chart illustrating an example of a method for managing Internet telephony service based on real-time and historical data, consistent with disclosed embodiments, with reference to FIG. 5A-5D. In this example, an electronic device (e.g., network resource management system 500 of FIG. 5A) executes a method 600 to interact with one or more other devices (e.g., switches 504 and 508 and data center 506A of FIG. 5A) for managing network resources for a multimedia communication based on real-time and historical data. While the chart discloses the following steps in a particular order, it will be appreciated that at least some of the steps can be moved, modified, or deleted where appropriate, consistent with the teachings of the present disclosure. While the following steps are indicated as being performed by an electronic device, it is appreciated that the steps can be performed by more than one electronic device.

Method 600 begins with step S601 in which endpoint 501A of FIG. 5A transmits a request to access SBC (and/or SIP proxy and registrar) of switch 504 to initiate a VoIP session with endpoint 501B. In some embodiments, the initiation can be performed with SIP. In step S602, access SBC (and/or SIP proxy and registrar) of switch 504 transmits the VoIP session request, which can include the signaling data of the requested VoIP session, to the communication servers (e.g., communication servers 119A-D) of data center 506A.

In step S603, after receiving the VoIP session request, data center 506A queries network resource management system 500 for information about network resources for providing a pre-determined quality of service for the requested VoIP session. The information may include a pre-determined media path comprising a media server, a SBC, one or more network switches, and a carrier network, as well as the associated configuration settings (e.g., choice of codec), wherein the media path and/or the configuration settings are statistically proven to provide the requisite quality of VoIP service at a specific time and geographical location.

In step S604, in response to the query, network resource management system 500 transmits a response back to data center 506A to provide the information about network resources for providing a pre-determined quality of service for the requested VoIP session. The information can be generated by configuration and path selector engine 544, within the constraints (e.g., cost, and the VoIP service quality the user has subscribed to, etc.) imposed by service quality policy engine 542, and based on an association between expected and real-time quality of service measurement and configuration settings generated by service quality metric calculation engine 532 and service quality feedback engine 534. In this particular example, the configuration settings include selecting PSTN A to route the voice data.

While not shown in FIG. 6, service quality metric calculation engine 532 can constantly and periodically receive network and server metrics data from the network elements of FIG. 5A, without receiving any query from data centers 506, and generate or update a historical representation of the quality of service based on the received data.

In step S605, after receiving the query response, data center 506A processes the VoIP media data based on the configuration settings (e.g. selection of codec, selection of PSTN A, etc.) included in the query response. In step S606, data center 506A transmits the processed media data to the interconnect SBC of switch 508, according to the query response, which allows the interconnect SBC to generate SIP trunks for endpoint 501B. In step S607, data center 506A also transmits the VoIP data and configuration settings to PSTN gateway of switch 508 according to the query response, the PSTN gateway can then route the voice data to PSTN A, which then routes the traffic to user PSTN to complete the VoIP audio communication.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure herein. It is intended that the sequence of steps shown in figures are only for illustrative purposes and are not intended to be limited to any particular sequence of steps. As such, those skilled in the art can appreciate that these steps can be performed in a different order while implementing the same method.

It will also be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A computer-implemented method for facilitating media communication sessions along a path established between a plurality of endpoints over one or more networks, wherein each media communication session includes a transmission of one or more media data packets over the one or more networks, the method comprising:

receiving a request from a first endpoint of the plurality of endpoints to initiate a media communication session;

receiving a set of potential configurations, wherein each configuration includes a path involving one or more network elements, and a setting for processing the one or more media data packets over each path of the set of potential configurations;

receiving, for the each path, historical data that associates qualities of prior media communication sessions with prior network conditions;

predicting an expected quality associated with each of the set of potential configurations based on the qualities of prior media communication, the prior network conditions, and current network conditions at the each path; and determining a configuration for the requested media communication session from among the set of potential configurations based on a relationship between the expected qualities and a target quality for the requested media quality session, wherein the setting includes a selection of a codec, and wherein the codec is selected based on the target quality for the requested media communication session.

2. The computer-implemented method of claim 1, wherein the historical data includes history of a level of performance associated with the one or more network elements, wherein the level of performance is also associated with a geolocation and with at least one of a time and a day;

and wherein the expected qualities are determined based on the history of the level of performance.

3. The computer-implemented method of claim 1, wherein the codec is associated with a packet loss rate.

4. The computer-implemented method of claim 1, wherein the setting includes at least one of: sampling rate, compression rate, and transmission rate associated with the codec.

5. The computer-implemented method of claim 1, wherein the determination is further based on at least one of: an exception, an alarm, and an error received from one or more components along the path included in the determined configuration before or during the establishment of the media communication session.

6. The computer-implemented method of claim 1, wherein the determination is based on an identity of a user associated with the first endpoint.

7. A system for facilitating media communication sessions along a path established between a plurality of endpoints over one or more networks, wherein each media communication session includes a transmission of one or more media data packets over the one or more networks, the system comprising:
one or more memories having stored thereon computer-executable instructions; and
one or more processors configured to execute the stored instructions to:
receive a request from a first endpoint of the plurality of endpoints to initiate a media communication session;
receive a set of potential configurations, wherein each configuration includes a path involving one or more network elements, and a setting for processing the one or more media data packets over each path of;
receive, for the each path, historical data that associates qualities of prior media communication sessions with prior network conditions;
predict an expected quality associated with each of the set of potential configurations based on the qualities of prior media communication, the prior network conditions, and current network conditions at the each path; and
determine a configuration for the requested media communication session from among the set of potential configurations based on a relationship between the expected qualities and a target quality for the requested media quality session, wherein the setting includes a selection of a codec, and wherein the codec is selected based on the target quality for the requested media communication session.

8. The system of claim 7, wherein the one or more processors are configured to execute the stored instructions to obtain measurements of the current network conditions including: a measurement of connectivity along the path, and a measurement of capacity of at least one of the one or more network elements to process the media data packets.

9. The system of claim 8, wherein the measurement of connectivity along the path includes at least one of: transmitted packet counts, jitter, and round-trip delay time.

10. The system of claim 8, wherein the measurement of capacity of the at least one of the one or more network elements includes a queue depth reflecting a number of outstanding media processing requests to be processed by the at least one of the one or more network elements.

11. The system of claim 7, wherein the historical data includes history of a level of performance associated with the one or more network elements, wherein the level of performance is also associated with a geolocation and with at least one of a time and a day; and wherein the expected qualities are determined based on the history of the level of performance.

12. The system of claim 7, wherein the setting includes a selection of a codec and a setting of at least one of sampling rate, compression rate, and transmission rate associated with the codec, and wherein the setting of the at least one of sampling rate, compression rate, and transmission rate associated with the codec are based on the target quality for the requested media communication session, and the codec is associated with a packet loss rate.

13. The system of claim 7, wherein the determination is further based on at least one of: an exception, an alarm, and an error received from one or more components along the path included in the determined configuration before or during the establishment of the media communications session.

14. A non-transitory computer-readable medium storing instructions that are executable by one or more processors to cause the one or more processors to perform a method for facilitating media communication sessions over a path established between a plurality of endpoints over one or more networks, wherein each media communication session includes a transmission of one or more media data packets over the one or more networks, the method comprising:
receiving a request from a first endpoint of the plurality of endpoints to initiate a media communication session;
receiving a set of potential configurations, wherein each configuration includes a path involving one or more network elements, and a setting for processing the one or more media data packets over each path of the set of potential configurations;
receiving, for the each path, historical data that associates qualities of prior media communication sessions with prior network conditions;
predicting an expected quality associated with each of the set of potential configurations based on the qualities of prior media communication, the prior network conditions, and current network conditions at the each path; and
determining a configuration for the requested media communication session from among the set of potential configurations based on a relationship between the expected qualities and a target quality for the requested media quality session, wherein the setting includes a selection of a codec, and wherein the codec is selected based on the target quality for the requested media communication session.

15. The non-transitory computer-readable medium of claim 14, wherein the historical data includes history of a level of performance associated with the one or more network elements, wherein the level of performance is also associated with a geolocation and with at least one of a time and a day; and wherein the expected qualities are determined based on the history of the level of performance.

16. The non-transitory computer-readable medium of claim 14, wherein the determination is further based on at least one of: an exception, an alarm, and an error received from one or more components along the path before or during the establishment of the media communication session.

17. The computer-implemented method of claim 1, wherein each configuration includes a choice of codec to be used in the one or more network elements.

18. The computer-implemented method of claim 1, wherein the historical data further associates qualities of prior media communication sessions with a prior setting for processing the one or more media data packets over the each path; wherein the configuration is determined based on the prior setting.

19. The computer-implemented method of claim 1, wherein the expected quality is predicted based on a degree of similarity between the prior network conditions and current network conditions.

20. The computer-implemented method of claim 1, wherein the expected quality is predicted based on a weighted average of parameters representing the prior network conditions and parameters representing the current network conditions; wherein the method further comprises: increasing a weight associated with the parameters representing the current network conditions upon receiving at least one of: an exception, an alarm, and an error received from at least one of the one or more network elements.

21. The system of claim 7, wherein the historical data further associates qualities of prior media communication sessions with a prior setting for processing the one or more media data packets over the each path; wherein the configuration is determined based on the prior setting.

22. The system of claim 7, wherein the expected quality is predicted based on a degree of similarity between the prior network conditions and current network conditions.

23. The system of claim 7, wherein the expected quality is predicted based on a weighted average of parameters representing the prior network conditions and parameters representing the current network conditions; wherein the method further comprises: increasing a weight associated with the parameters representing the current network conditions upon receiving at least one of: an exception, an alarm, and an error received from at least one of the one or more network elements.

24. The non-transitory computer-readable medium of claim 14, wherein the historical data further associates qualities of prior media communication sessions with a prior setting for processing the one or more media data packets over the each path; wherein the configuration is determined based on the prior setting.

25. The non-transitory computer-readable medium of claim 14, wherein the expected quality is predicted based on a degree of similarity between the prior network conditions and current network conditions.

26. The non-transitory computer-readable medium of claim 14, wherein the expected quality is predicted based on a weighted average of parameters representing the prior network conditions and parameters representing the current network conditions; wherein the method further comprises: increasing a weight associated with the parameters representing the current network conditions upon receiving at least one of: an exception, an alarm, and an error received from at least one of the one or more network elements.

* * * * *